United States Patent
Bergeron et al.

(10) Patent No.: US 11,995,993 B2
(45) Date of Patent: May 28, 2024

(54) CREW ALERTING SYSTEMS AND METHODS FOR MOBILE PLATFORMS

(71) Applicant: BOMBARDIER INC., Dorval (CA)

(72) Inventors: Marc Bergeron, LaSalle (CA); Benoit Ouellette, Montreal (CA)

(73) Assignee: BOMBARDIER INC., Dorval (CA)

( * ) Notice: Subject to any disclaimer, the term of this patent is extended or adjusted under 35 U.S.C. 154(b) by 159 days.

(21) Appl. No.: 16/704,457

(22) Filed: Dec. 5, 2019

(65) Prior Publication Data

US 2020/0184831 A1 Jun. 11, 2020

Related U.S. Application Data

(60) Provisional application No. 62/776,749, filed on Dec. 7, 2018.

(51) Int. Cl.
| | |
|---|---|
| *G08G 5/00* | (2006.01) |
| *G01C 23/00* | (2006.01) |
| *G08G 5/02* | (2006.01) |
| *B64D 43/00* | (2006.01) |
| *B64D 45/00* | (2006.01) |
| *G06Q 10/06* | (2023.01) |

(52) U.S. Cl.
CPC ......... *G08G 5/0021* (2013.01); *G01C 23/005* (2013.01); *G08G 5/0013* (2013.01); *G08G 5/0052* (2013.01); *G08G 5/0078* (2013.01); *G08G 5/0091* (2013.01); *G08G 5/025* (2013.01)

(58) Field of Classification Search
None
See application file for complete search history.

(56) References Cited

U.S. PATENT DOCUMENTS

| | | | |
|---|---|---|---|
| 5,454,074 A | 9/1995 | Hartel et al. | |
| 5,508,928 A * | 4/1996 | Tran | G01S 7/36 342/16 |
| 5,522,026 A | 5/1996 | Records et al. | |
| 5,739,769 A * | 4/1998 | Vladimir | B64D 43/00 701/14 |
| 8,527,871 B2 | 9/2013 | Holder et al. | |

(Continued)

FOREIGN PATENT DOCUMENTS

WO   WO-2017191543 A1 * 11/2017 ............. G06Q 50/30

*Primary Examiner* — Aniss Chad
*Assistant Examiner* — Madison R Hughes
(74) *Attorney, Agent, or Firm* — Norton Rose Fulbright Canada LLP

(57) ABSTRACT

A crew alerting system for a mobile platform includes a display device defining a display area, a processor operatively coupled to the display device, and a memory storing instructions that cause the processor to: upon receiving notification of an occurrence of a manual system configuration associated with the mobile platform, generate a first output for causing the display device to display a first indication in the display area, the first indication comprising a first textual message. The processor is further configured to, upon receiving notification of an occurrence of an automated system configuration associated with the mobile platform, generate a second output for causing the display device to display a second indication in the display area, the second indication comprising a second textual message accompanied by a supplemental indication such as a graphical indication.

20 Claims, 4 Drawing Sheets

(56) References Cited

U.S. PATENT DOCUMENTS

| | | | | |
|---|---|---|---|---|
| 9,663,241 | B1* | 5/2017 | Kawalkar | G08G 5/0021 |
| 11,046,452 | B1* | 6/2021 | Viswanatha | G06T 11/20 |
| 2016/0083107 | A1* | 3/2016 | Vautier | G08G 5/0021 |
| | | | | 340/963 |
| 2017/0088284 | A1* | 3/2017 | Holder | B64D 45/00 |
| 2017/0345318 | A1 | 11/2017 | Kim et al. | |
| 2018/0022469 | A1* | 1/2018 | Noice | G09G 5/003 |
| | | | | 345/520 |

* cited by examiner

CREW ALERTING SYSTEMS AND
METHODS FOR MOBILE PLATFORMS

CROSS-REFERENCE TO RELATED
APPLICATION AND CLAIM OF PRIORITY

The present application claims priority from U.S. Provisional Patent Application No. 62/776,749 filed on Dec. 7, 2018, the entire contents of which are incorporated by reference herein.

FIELD

This relates to generally to aircraft and other mobile platforms, and more particularly to crew alerting systems.

BACKGROUND

Aircraft are typically equipped with a crew alerting system (CAS) to provide the flight crew with annunciations associated with various aircraft systems. The combination of engine indications and such crew alerting system is commonly known as an engine indication and crew alerting system (EICAS).

Messages provided by conventional display-based crew alerting systems are textual messages typically of 12-42 characters and are organized in different colors corresponding to the level of the alert or relevant condition. These messages serve to alert the flight crew of system failures or inform the flight crew of a particular condition of a system of the aircraft. The messages are static in nature and the flight crew must often consult a source of information separate from the crew alerting system to supplement such messages.

SUMMARY

According to an aspect, there is provided a crew alerting system for a mobile platform, the system comprising: a display device defining a display area; one or more data processors operatively coupled to the display device; and non-transitory machine-readable memory operatively coupled to the one or more data processors and storing instructions executable by the one or more processors and configured to cause the one or more processors to: upon receiving notification of an occurrence of a manual system configuration associated with the mobile platform, generate a first output for causing the display device to display a first indication in the display area, the first indication comprising a first textual message; and upon receiving notification of an occurrence of an automated system configuration associated with the mobile platform, generate a second output for causing the display device to display a second indication in the display area, the second indication comprising a second textual message accompanied by a supplemental indication.

In some embodiments, the first and second textual messages are of a same color.

In some embodiments, the first and second textual messages are white.

In some embodiments, the first and second textual messages comprise a same content.

In some embodiments, the supplemental indication is disposed on a same line as the second textual message.

In some embodiments, the supplemental indication is disposed in front of the second textual message.

In some embodiments, the supplemental indication has a different color than the second textual message.

In some embodiments, the supplemental indication is adjacent to the second textual message.

In some embodiments, the supplemental indication is a graphical indication.

In some embodiments, the graphical indication comprises a circle.

In some embodiments, the manual system configuration and the automated system configuration are associated with a same system of the aircraft.

In some embodiments, the manual system configuration and the automated system configuration perform equivalent actions on the system of the aircraft.

According to another aspect, there is provided an aircraft comprising a crew alerting system as described herein.

According to another aspect, there is provided a crew alerting system for a mobile platform, the system comprising: a display device defining a display area; one or more data processors operatively coupled to the display device; and non-transitory machine-readable memory operatively coupled to the one or more data processors and storing instructions executable by the one or more processors and configured to cause the one or more processors to: upon receiving notification of an occurrence of an automated system configuration associated with the mobile platform, generate an output for causing the display device to display an indication in the display area, the indication comprising a textual message in a color associated with a status message accompanied by a graphical indication in a color associated with an advisory alert.

According to another aspect, there is provided a method for alerting a crew of a mobile platform of a system configuration associated with the mobile platform using a display area of a crew alerting system of the mobile platform, the method comprising: upon receiving notification of an occurrence of a manual system configuration associated with the mobile platform, displaying a first indication in the display area of the crew alerting system of the mobile platform, the first indication comprising a first textual message; and upon receiving notification of an occurrence of an automated system configuration associated with the mobile platform, displaying a second indication in the display area of the crew alerting system of the mobile platform, the second indication comprising a second textual message accompanied by a supplemental indication.

In some embodiments, the first and second textual messages are of a same color.

In some embodiments, the first and second textual messages are white.

In some embodiments, the first and second textual messages comprise a same content.

In some embodiments, the supplemental indication is disposed on the same line as the second textual message.

In some embodiments, the supplemental indication is disposed in front of the second textual message.

In some embodiments, the supplemental indication has a different color than the second textual message.

In some embodiments, the supplemental indication is adjacent the second textual message.

In some embodiments, the supplemental indication is a graphical indication.

In some embodiments, the graphical indication comprises a circle.

In some embodiments, the manual system configuration and the automated system configuration are associated with a same system of the aircraft.

In some embodiments, the manual system configuration and the automated system configuration perform equivalent actions on the system of the aircraft.

Other features will become apparent from the drawings in conjunction with the following description.

BRIEF DESCRIPTION OF DRAWINGS

In the figures which illustrate example embodiments.

DETAILED DESCRIPTION

The present disclosure describes systems, display devices and methods associated with crew alerting systems of aircraft and other mobile platforms. Even though various aspects of the present disclosure are described in the context of aircraft, it is understood that aspects disclosed herein are equally applicable to centralized alerting systems for other systems and mobile platforms (e.g., vehicles) such as trains, ships and busses for example. In various embodiments, the systems, display devices and methods disclosed herein may be considered to provide crew alerting systems of improved functionality compared to conventional crew alerting systems by providing awareness-enhancing indications while being mindful of the limited real estate available on an aircraft flight deck.

In various embodiments, the systems, display devices and methods disclosed herein may, in some situations, provide enhanced awareness of a change in configuration of a component or system of the aircraft that has been executed either manually by the flight crew or automatically by an automated system of the aircraft. Accordingly, in some embodiments, the systems, display devices and methods disclosed herein may contribute toward enhancing awareness of the flight crew and alleviating the flight crew's workload at times when the flight crew is being alerted of a relevant condition requiring the flight crew's attention.

Aspects of various embodiments are described through reference to the drawings.

Figure 1:
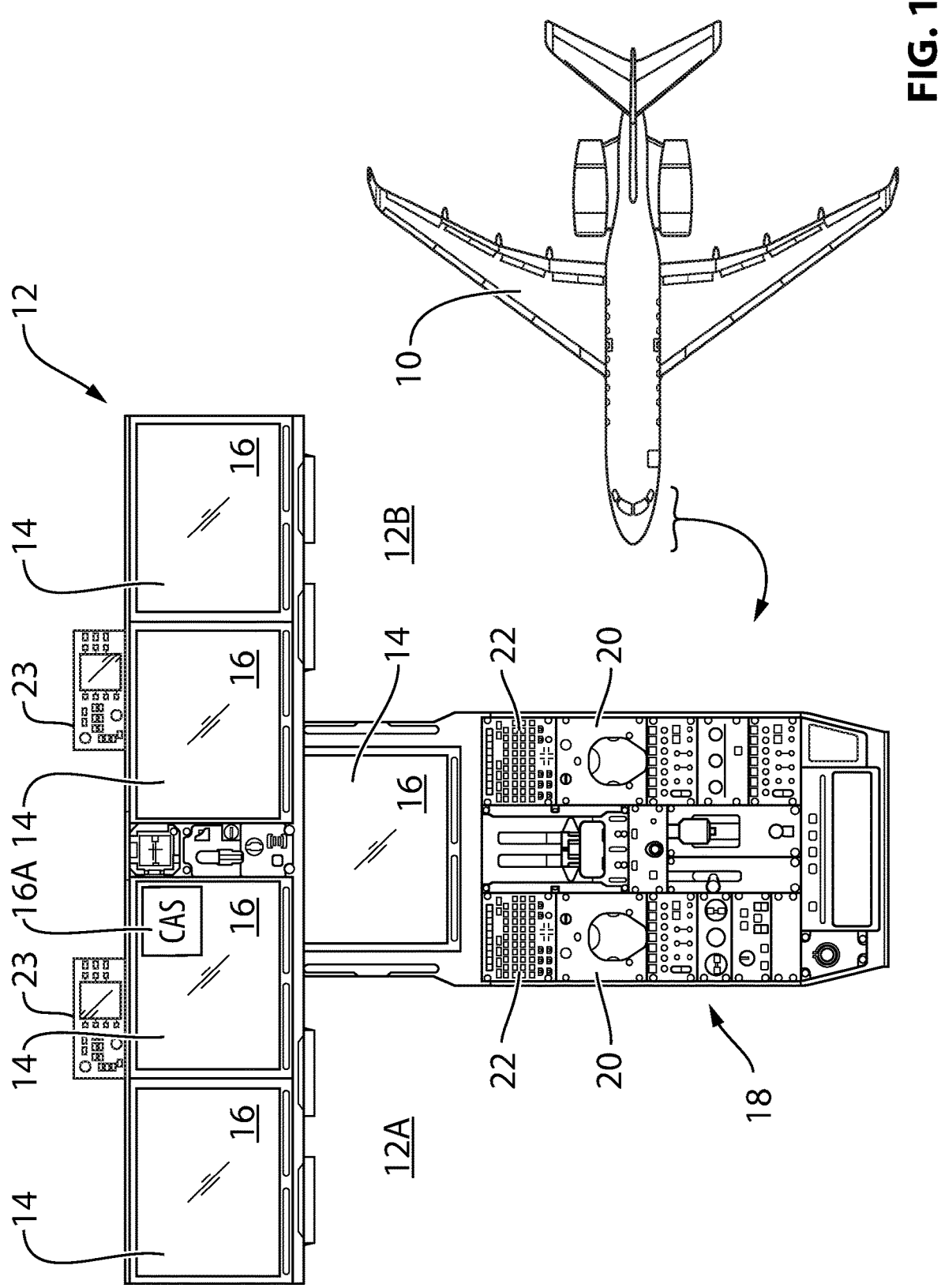
FIG. 1 shows an aircraft flight deck and a corresponding aircraft comprising the flight deck, according to an embodiment.

FIG. 1 shows an exemplary aircraft 10 (i.e., mobile platform) and a partial schematic representation of flight deck 12 which may be part of aircraft 10. Aircraft 10 may be a corporate, private, commercial or any other type of aircraft. For example, aircraft 10 may be a fixed-wing aircraft. In various embodiments, aircraft 10 may be a narrow-body, twin engine jet airliner, a (e.g., ultra-long range) business jet, a twin-engine turboprop airliner or a regional jet airliner. Flight deck 12 may comprise additional or fewer elements than those shown and described herein. Flight deck 12 may comprise left portion 12A intended to be used by a pilot (sometimes referred to as "captain") of aircraft 10 and right portion 12B intended to be used by a co-pilot (sometimes referred to as "first officer") of aircraft 10. Left portion 12A and right portion 12B may comprise functionally identical components so that at least some operational redundancy may be provided between left portion 12A and right portion 12B of flight deck 12. As used herein, the term "flight crew" is intended to encompass one or more individuals responsible for the operation of aircraft 10 during flight. Such individuals may, for example, include the pilot and/or the co-pilot. Similarly, the term "crew" is intended to encompass one or more individuals responsible for or associated with the operation of a mobile platform comprising a crew alerting system as disclosed herein.

Flight deck 12 may comprise one or more display devices 14 providing respective display areas 16. In the exemplary configuration of flight deck 12 shown in FIG. 1, left portion 12A and right portion 12B may each comprise two display devices 14 and an additional display device 14 may be provided in pedestal region 18 of flight deck 12. Display device 14 provided in pedestal region 18 may be shared between the pilot and the co-pilot during normal operation of aircraft 10. Display devices 14 may include one or more cathode-ray tubes (CRTs), liquid crystal displays (LCDs), plasma displays, light-emitting diode (LED) based displays, organic light-emitting diode (OLED) based displays, or any known or other type of display device that may be suitable for use in flight deck 12. Display devices 14 may be configured to dynamically display operational and status information about various systems of aircraft 10, information related to flight/mission planning, maps and any other information that may be useful for the flight crew (e.g., pilot(s)) during the operation of aircraft 10. Display devices 14 may facilitate dialog between the flight crew and various systems of aircraft 10 via suitable graphical user interfaces. Flight deck 12 may comprise one or more data input devices such as, for example, one or more cursor control devices 20, one or more multi-function keypads 22 and one or more (e.g., standalone or multifunction) controllers 23 that may permit data entry by the flight crew. For example, such controller(s) 23 may be disposed in the glare shield above one or more display devices 14.

One or more of display devices 14 may comprise CAS display area 16A dedicated to centralized crew alerting system 24 shown schematically in FIG. 2 and referred hereinafter as "CAS 24", during one or more phases of operation of aircraft 10. In some embodiments, a single instance of CAS display area 16A may be displayed on a display device 14 that is conveniently located to be visible by both the pilot and the co-pilot. Alternatively, in some embodiments, more than one instance of CAS display area 16A may be displayed on more than one respective display device 14. In some embodiments, the display device 14 on which CAS display area 16A is provided may also include engine indications and therefore CAS display area 16A may be part of an engine indication and crew alerting system (EICAS). In some embodiments, CAS display area 16A may be selectively displayed on one or more display devices 14 of flight deck 12 based on input from the flight crew.

It is understood that CAS display area 16A and the display of its contents is not limited to one or more display devices 14 onboard aircraft 10. For example, CAS display area 16A could, alternatively or in addition, be provided on a display device that is off of aircraft 10. For example, CAS display area 16A could be provided on a display device of a ground station to alert a ground-based operator of aircraft 10 or support (e.g., maintenance) personnel. Hence, even though the present disclosure refers to alerting a flight crew of aircraft 10, it is understood that relevant information could be transmitted from aircraft 10 to a location remote from aircraft 10 (e.g., ground station) in order to alert an individual at such location in accordance with aspects of the present disclosure.

Figure 2:
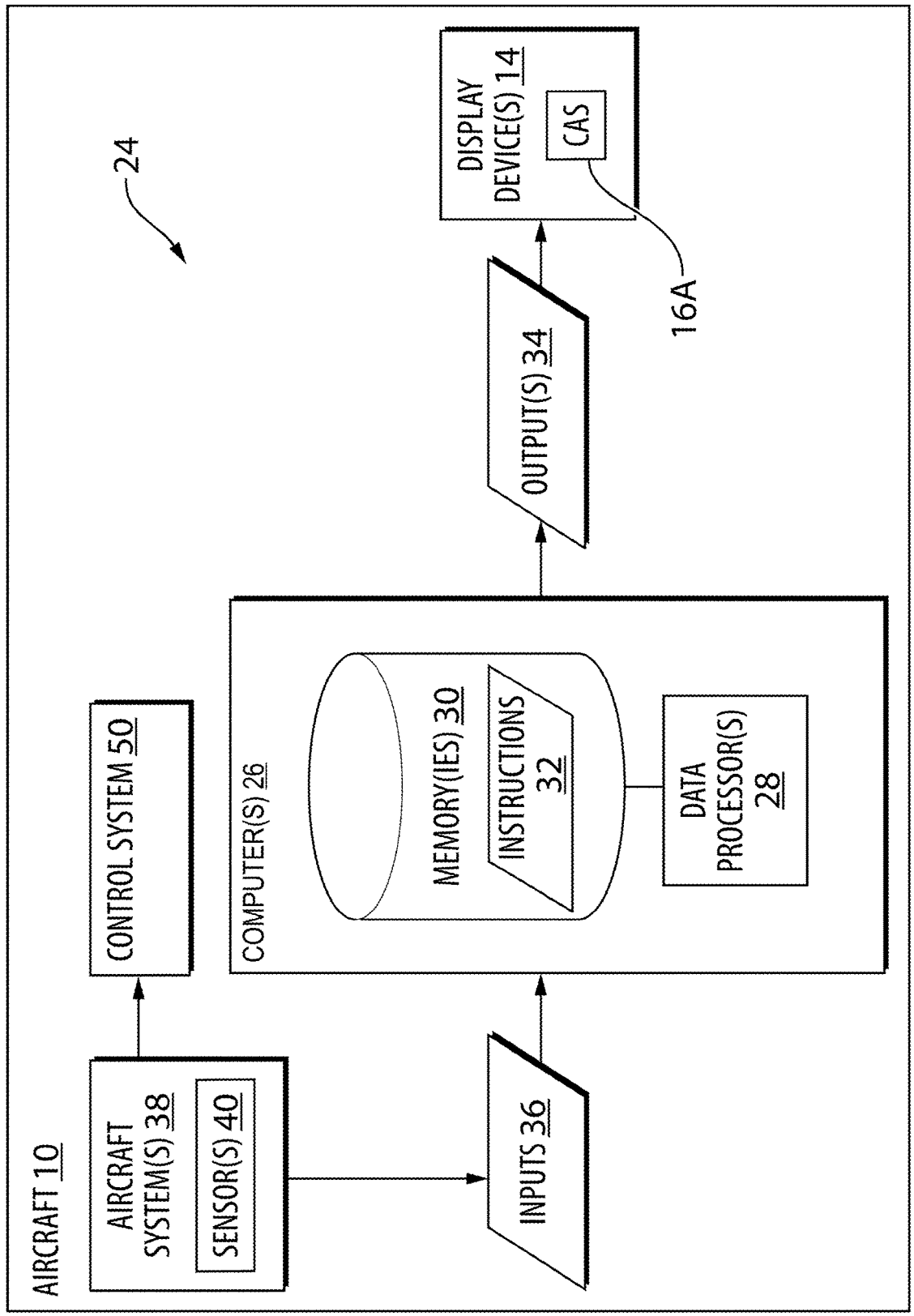
FIG. 2 shows a schematic representation of a crew alerting system of the aircraft of FIG. 1, according to an embodiment.

FIG. 2 shows a schematic representation of an exemplary CAS 24 which may be part of aircraft 10. CAS 24 may be integrated with flight deck 12. CAS 24 may comprise one or more computers 26 (referred hereinafter in the singular) operatively coupled to one or more display devices 14 (referred hereinafter in the singular) of flight deck 12. Computer 26 may comprise one or more data processors 28 (referred hereinafter in the singular) and one or more computer-readable memories 30 (referred hereinafter in the singular) storing machine-readable instructions 32 executable by data processor 28 and configured to cause data processor 28 to generate one or more outputs 34 (referred hereinafter in the singular). Output 34 may comprise one or more signals for causing display device 14 of aircraft 10 to display CAS display area 16A and its contents.

Computer 26 may receive input(s) 36 in the form of data or information that may be processed by data processor 28 based on instructions 32 in order to generate output 34. For example, input 36 may comprise information (data) indicative of a configuration or reconfiguration associated with one or more systems 38 of aircraft 10.

Systems 38 of aircraft 10 may include, for example, a hydraulic system, an electrical system, a fuel system, flight control surfaces, a navigation system, an engine and/or any other aircraft systems.

One or more systems 38 of aircraft 10 may be controlled or actuated by a control system 50, for example, to configure or reconfigure a system 38 or various components of a system 38. In some embodiments, control system 50 may comprise one or more computers, for example, similar to computer 26 as described herein. In some embodiments, control system 50 may be a part of computer 26. As such, an automated configuration of a system 38 may be caused by control system 50, in an example, without any manual input from the flight crew. Control system 50 can be considered part of an avionics suite of aircraft 10. For example, control system 50 can be configured to carry out additional functions than those described herein. In some embodiments, control system 50 can be of the type known as a flight control computer (FCC) of aircraft 10. In some embodiments, control system 50 can include a fly-by-wire control system of aircraft 10.

One or more systems 38 of aircraft 10 may also be controlled or actuated by the flight crew directly accessing a system 38, for example, to configure or reconfigure a system 38 or various parameters of a system 38. The flight crew may also control one or more systems 38 by way of manual input to control system 50. As such, a manual configuration of a system 38 may be caused by a manual action performed by the flight crew. In some embodiments, the same change to system 38 results from either a manual system configuration or an automated system configuration. Furthermore, in some embodiments a manual system configuration and an automated system configuration may perform equivalent actions on a system 38 of the aircraft.

In some embodiments, input 36 may alternatively or in addition comprise information (data) indicative of, or notification of, occurrence of a configuration associated with one or more systems 38 of aircraft 10 and whether the configuration associated with one or more systems 38 of aircraft 10 was an automated configuration or a manual configuration. Examples of configuration changes could include: a switch from a magnetic heading to a true heading or vice versa in a navigation system, an activation or deactivation of a hydraulic pump, a change in position of a flight control surface, discharge of a fire extinguishing bottle, and opening or closing of a bleed air system valve.

In some embodiments, input(s) 36 may include or be indicative of sensed signals acquired via one or more (e.g., pressure, position, acceleration, temperature or other) sensors 40 associated with one or more aircraft systems 38. Accordingly, input(s) 36 may comprise one or more sensed parameters indicative of one or more states or configurations of aircraft system(s) 38.

As described further below, computer 26 may, based on input(s) 36, generate output 34 for causing display device 14 to display one or more combined advisory and status indications as described below and associated with a configuration of a system 38 of aircraft 10 in CAS display area 16A.

Computer 26 may be part of an avionics suite of aircraft 10. For example, in some embodiments, computer 26 may carry out additional functions than those described herein including the management of one or more graphic user interfaces of flight deck 12 and/or other part(s) of aircraft 10. In various embodiments, computer 26 may comprise more than one computer or data processor where the methods disclosed herein (or part(s) thereof) could be performed using a plurality of computers or data processors, or, alternatively, be performed entirely using a single computer or data processor. In some embodiments, computer 26 could be physically integrated with (e.g., embedded in) display device 14.

Data processor 28 may comprise any suitable device(s) configured to cause a series of steps to be performed by computer 26 so as to implement a computer-implemented process such that instructions 32, when executed by computer 26 or other programmable apparatus, may cause the functions/acts specified in the methods described herein to be executed.

Memory 30 may comprise any suitable known or other machine-readable storage medium. Memory 30 may comprise non-transitory computer readable storage medium. Memory 30 may comprise any storage means (e.g. devices) suitable for retrievably storing machine-readable instructions 32 executable by data processor 28.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 30) having computer readable program code (e.g., instructions 32) embodied thereon. The computer program product may, for example, be executed by computer 26 to cause the execution of one or more methods disclosed herein in entirety or in part.

Computer program code for carrying out operations for aspects of the present disclosure in accordance with instructions 32 may be written in any combination of one or more programming languages. Such program code may be executed entirely or in part by computer 26 or other data processing device(s). It is understood that, based on the present disclosure, one skilled in the relevant arts could readily write computer program code for implementing the methods disclosed herein.

Figure 3:
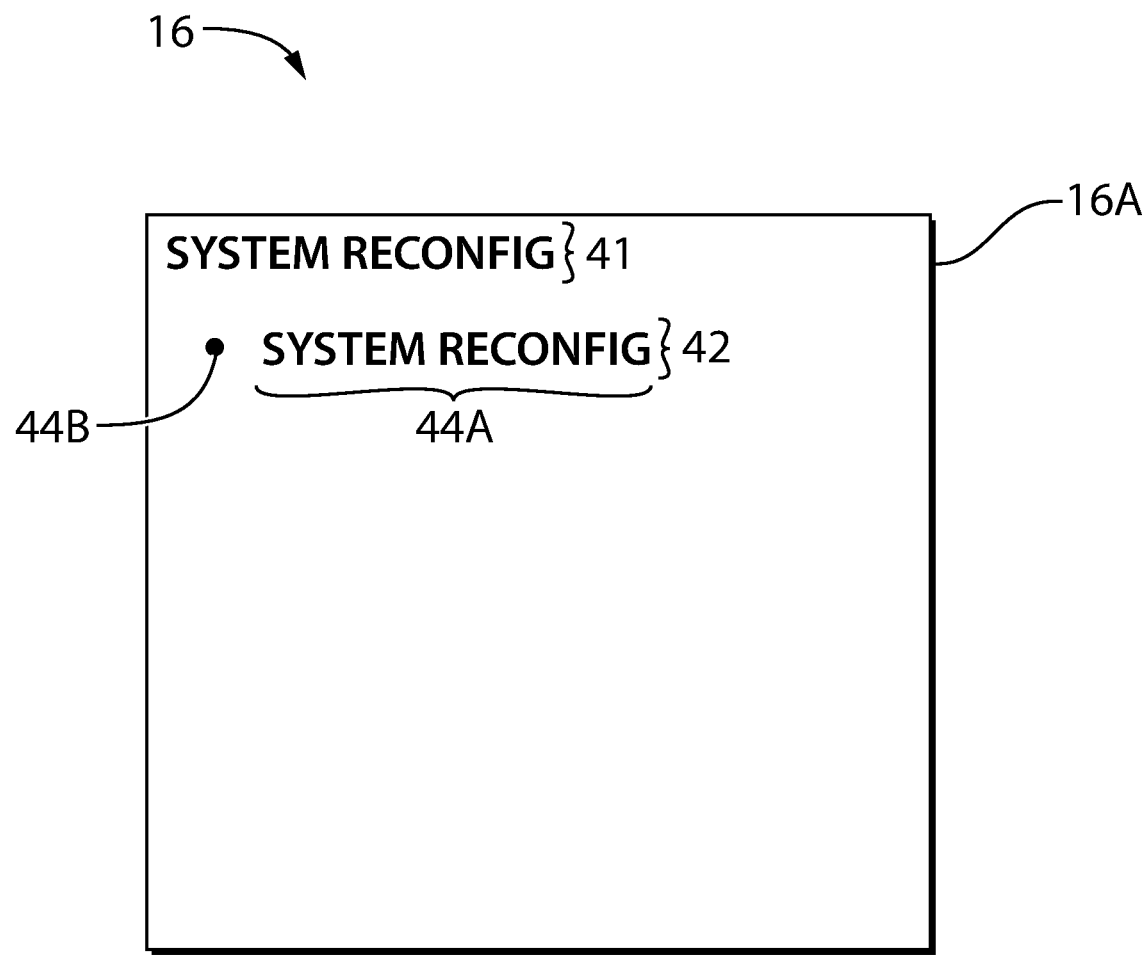
FIG. 3 shows a display area associated with the crew alerting system of FIG. 2, the display area including status indications.

In some embodiments, crew alerting system 24 may comprise display device 14 defining CAS display area 16A dedicated to crew alerting system 24. Data processor 28 of computer 26 may be operatively coupled to display device 14. Machine-readable memory 30 may be operatively coupled to data processor 28 and store instructions 32 executable by processor 28. Such instructions 32 may be configured to cause processor 28 to use data representative of input(s) 36 and generate output 34 configured to cause display device 14 to display a first indication 41 and/or a second indication 42 (for example, as shown in FIG. 3 and described in further detail below).

The data used by data processor 28 may be indicative of a condition such as a configuration or reconfiguration associated with a system 38, and whether such configuration was caused manually or automatically. The existence of a particular configuration may be based on the evaluation of a logical expression such as, for example, the comparison of a sensed value to a threshold value. Accordingly, the data indicative of the existence of such relevant condition may be binary in nature based on whether the logical expression evaluated is true or false. For example, such relevant condition may include a system degradation (e.g., failure), non-normal condition or state associated with one or more of aircraft systems 38.

In some embodiments, data used by data processor 28 may include a substantially real-time value of a variable of system 38, and the variable may define a parameter or a configuration of a system 38 or a component of system 38. Such a value may be acquired via sensor 40. The variable value may be indicative of a configuration of system 38. Non-limiting examples of such variables may include: a status of a fuel pump of aircraft 10, a rotation speed (e.g., RPM) associated with an auxiliary power unit (APU) of aircraft 10 during start-up, a quantity of fuel remaining in a fuel tank of aircraft 10, an outside temperature indicating an icing risk, a position of a flight control surface of aircraft 10, a temperature inside a cabin of aircraft 10 and a pressure inside the cabin of aircraft 10. Aspects of the present disclosure are not intended to be limited to the variables recited herein as examples. Instead, aspects of the present disclosure may be applicable to any suitable known or other relevant conditions that may be indicated via traditional or other aircraft crew alerting systems.

In some embodiments, data used by data processor 28 may indicate whether a configuration or reconfiguration or a system 38 was successfully completed, and whether such a configuration was commanded manually by the flight crew or automatically.

FIG. 3 shows a CAS display area 16A associated with CAS 24 of FIG. 2 where CAS display area 16A includes a first indication 41 and a second indication 42.

CAS display area 16A may be a sub-region of larger display area 16 of display device 14. For example, CAS display area 16A may be disposed adjacent to engine-related indications and therefore CAS display area 16A may, in some embodiments, be considered part of an EICAS.

In some embodiments, multiple first indications 41 and/or multiple second indications 42 may be displayed in CAS display area 16A.

A "status" may be understood as a specific aircraft system condition that is recognized using a visual indication, but does not require an alert and does not require flight crew response. These types of messages are sometimes used to determine airplane dispatch capability for subsequent flights.

An "alert" may be understood as a term used to describe a flight deck indication meant to attract the attention of and identify to the flight crew a non-normal operational or airplane system condition. Alerts may be classified at levels or categories corresponding to Warnings, Cautions, and Advisories, as discussed in further detail below. Alert indications may also include non-normal range markings (for example, exceedences on instruments and gauges.)

An "advisory" may be understood as the level or category of alert for conditions that require flight crew awareness and may require subsequent flight crew response.

Indications (e.g., status, alert, advisory) may be displayed in CAS display area 16A in a color that is indicative of the criticality or level of alert of an associated relevant condition to provide the flight crew with a visual indication of the condition and its priority.

For example, red may be used for an indication associated with a "warning-alert" level requiring immediate awareness and action by the flight crew, amber or yellow may be used for an indication associated with a "caution-alert" level requiring immediate awareness and subsequent action by the flight crew, cyan or any colors other than green or red may be used for an indication associated with an "advisory" level requiring crew awareness, and white may be used for a status indication associated with a system state.

First indication 41 may provide an indication or message of a system condition on CAS display area 16A. In some embodiments, first indication 41 may be a "status" indication and may be displayed in white to indicate that it represents a system state. In some embodiments, a first indication 41 may include one or more textual messages. In some embodiments, a textual message of first indication 41 may be longer than 42 character or may be relatively short (e.g., less than 42 characters), and may be binary in nature and displayed based on the evaluation of a logical expression, for example, whether or not a system has been configured or reconfigured. For example, a textual message of first indication 41 may be displayed when an associated logical expression is true and may be hidden or removed from CAS display area 16A when the associated logical expression is false.

In some embodiments, a first indication 41 may act as confirmation to the flight crew that a system 38 of aircraft 10 has been reconfigured manually, for example, for the remainder of the flight. As such, first indication 41 may show that system 38 is configured as per the intent of the flight crew (for example, the pilot).

As shown in an example in FIG. 3, a first indication 41 may include a textual message containing the text "SYSTEM RECONFIG" displayed in the color white. In this specific example, "SYSTEM RECONFIG" may represent a status indication associated with a system state, namely that a system 38 has been reconfigured by way of a manual input from the flight crew, and does not require an alert and does not require a flight crew response.

FIG. 3 also illustrates a second indication 42. Second indication 42 may provide an indication or message of a combined "status" and "advisory" message, in particular, a system condition "status" accompanied by an "advisory" alert to the flight crew. In some embodiments, second indication 42 may include one or more textual messages 44A as "status" indications and one or more supplemental indications 44B as "advisory" indications. Supplemental indication 44B may accompany textual message 44A, and may be displayed and hidden simultaneously with textual message 44A. In some embodiments, a textual message 44A and a supplemental indication 44B of a second indication 42 may be displayed in CAS display area 16A adjacent one another.

In some embodiments, textual message 44A of second indication 42 may have any or all of the same text, shape, color, and position of first indication 41. In an example, textual message 44A of second indication 42 and the textual message of first indication 41 may both contain white text. Textual message 44A may also thus perform the same "status" indication function for the same system as an associated first indication 41.

Supplemental indication 44B may comprise a textual or a non-textual indication to perform an "advisory" indication function. For example, supplemental indication 44B may comprise an alphanumeric indication such as one or more numerical values and/or one or more textual indications that may indicate additional configuration details or variables associated with the relevant condition indicated by textual message 44A.

Alternatively or in addition, supplemental indication 44B may comprise a graphical (e.g., pictorial) indication which may facilitate the interpretation of supplemental indication 44B by the flight crew. The term "graphical" is intended to encompass any non-textual indications such as, for example, pictures, symbols, diagrams, curves, colored labels, segments, carets, connectors, markers, icons, bars and circles. The use of graphical indications may be preferred in some situations to facilitate the interpretation of supplemental indication 44B by providing "at-a-glance" information without having to read an alphanumeric message.

In some embodiments, supplemental indication 44B may have a same color as textual message 44A, such as white, for example. In some embodiments, supplemental indication 44B may have a different color than textual message 44A.

In an example, supplemental indication 44B may be a graphical indication of a cyan circle, with or without fill. In other examples, supplemental indication 44B may form a different shape, such as a triangle or a square, or a graphical image such as a smiley face, or be different in color.

In some embodiments, a second indication 42 (for example, a "SYSTEM RECONFIG" accompanied by a cyan circle) may be displayed at a location on CAS display area 16A that corresponds at least in part with a location on CAS display area 16A at which a first indication 41 for the same configuration and/or reconfiguration (for example, a "SYSTEM RECONFIG") is displayed. For example, in some embodiments textual message 44A (for example, "SYSTEM RECONFIG") of second indication 42 may be displayed at the same location on CAS display area 16A as the textual message of first indication 41 (for example, "SYSTEM RECONFIG").

In some embodiments, all or part of second indication 42 may be displayed in CAS display area 16A in a color that is indicative of the criticality or level of alert associated with the "status" system of the relevant condition indicated by textual message 44A, such as a configuration or reconfiguration of a system 38, to provide the flight crew a visual indication of the condition and its priority.

Supplemental indication 44B may be indicative of a type of configuration or reconfiguration performed on an associated system 38. For example, the presence of a supplemental indication 44B in a second indication 42 may be associated with an automated configuration or reconfiguration of the associated system 38. Similarly, the absence of supplemental indication 44B in a second indication 42, or simply the presence of a first indication 41 associated with the configuration or reconfiguration of the associated system 38 may indicate that the configuration or reconfiguration indicated by textual message 44A or first indication 41 was performed manually by the flight crew. Accordingly, supplemental indication 44B may be an indication that a configuration or reconfiguration was performed automatically, for example, by control system 50.

In some embodiments, the presentation or display of supplemental indication 44B may supplement textual message 44A such that the flight crew is alerted of the same condition or configuration status as provided by first indication 41, while further alerting the flight crew that they did not perform any manual controls themselves to lead to the status of system 38, however, the status was achieved automatically, for example by control system 50. In some embodiments, the same change to system 38 results from either a manual configuration or an automated configuration. Furthermore, in some embodiments a manual system configuration and an automated system configuration may perform equivalent actions on a system 38 of the aircraft.

Thus, in an example the combination of the color of textual message 44A and graphical indication 44B may be used for a second indication 42 associated with a type of system configuration or reconfiguration.

As shown in FIG. 3, supplemental indication 44B may accompany textual message 44A in a second indication 42 in a single CAS display area 16A that is dedicated to CAS 24. In some embodiments, textual message 44A and an accompanying supplemental indication 44B may be displayed together as a single line item forming second indication 42 in CAS display area 16A. In some embodiments, supplemental indication 44B may be disposed in front of textual message 44A.

For example, textual message 44A and supplemental indication 44B may be displayed laterally adjacent one another and together in CAS display area 16A. Alternatively, textual message 44A and associated supplemental indication 44B may be displayed as adjacent line items in some embodiments due to a length of textual message 44A and/or an amount of display space required for associated supplemental indication 44B. In some embodiments, textual message 44A and associated supplemental indication 44B may be considered to be displayed together to achieve visual cohesion allowing textual message 44A and associated supplemental indication 44B to be interpreted together as a second indication 42. In some embodiments, visual cohesion may be achieved by proximity of textual message 44A and associated supplemental indication 44B. For example, textual message 44A and associated supplemental indication 44B may be positioned to have a vertical and/or lateral space (gap) of less than about 0.5 inch (13 mm) between them.

As shown in the example illustrated in FIG. 3, a second indication 42 may include a textual message 44A containing the text "SYSTEM RECONFIG" in the color white accompanied by an adjacent supplemental indication 44B that includes an image of a circle. In this specific example, "SYSTEM RECONFIG" may represent a "status" indication that a system 38 has been reconfigured. Supplemental indication 44B may represent an "advisory" indication to graphically indicate that the system reconfiguration was automated, for example, performed by control system 50 without manual input from the flight crew. The supplemental indication 44B may be cyan in color (indicating an automated reconfiguration).

In some embodiments, an automatic system reconfiguration may be the result of one or more actions or sequences of events within aircraft 10. For example, in a sequence of fire extinguishing, certain aircraft systems (such as fuel and hydraulic systems of the engine) may be configured to be shut down automatically.

Examples of text in a textual message 44A include "NAV MAG HEADING" (for example, related to a magnetic heading system configuration), "L BLEED VALVE OFF" (for example, related to a bleed air system configuration), "SPOILERS DEPLOYED" (for example, related to a flight control surface system configuration), "L PRIMARY FUEL PUMP OFF" (for example, related to a fuel pump system configuration), and "FIRE BOTTLE DISCHARGED" (for example, related to a fire extinguishing bottle system configuration), which may represent "status" indications of a configuration or reconfiguration of a particular system 38.

In some embodiments, second indication 42 may be displayed in CAS display area 16A instead of computer 26 generating an "advisory" output to cause display device 14 to display an "advisory" message associated with a system on CAS display area 16A.

In some embodiments, a configuration of a system 38 of aircraft 10 may be overridden or disabled. Accordingly, second indication 42 may be removed from CAS display area 16A. In some embodiments, second indication 42 may be replaced by another message.

Figure 4:
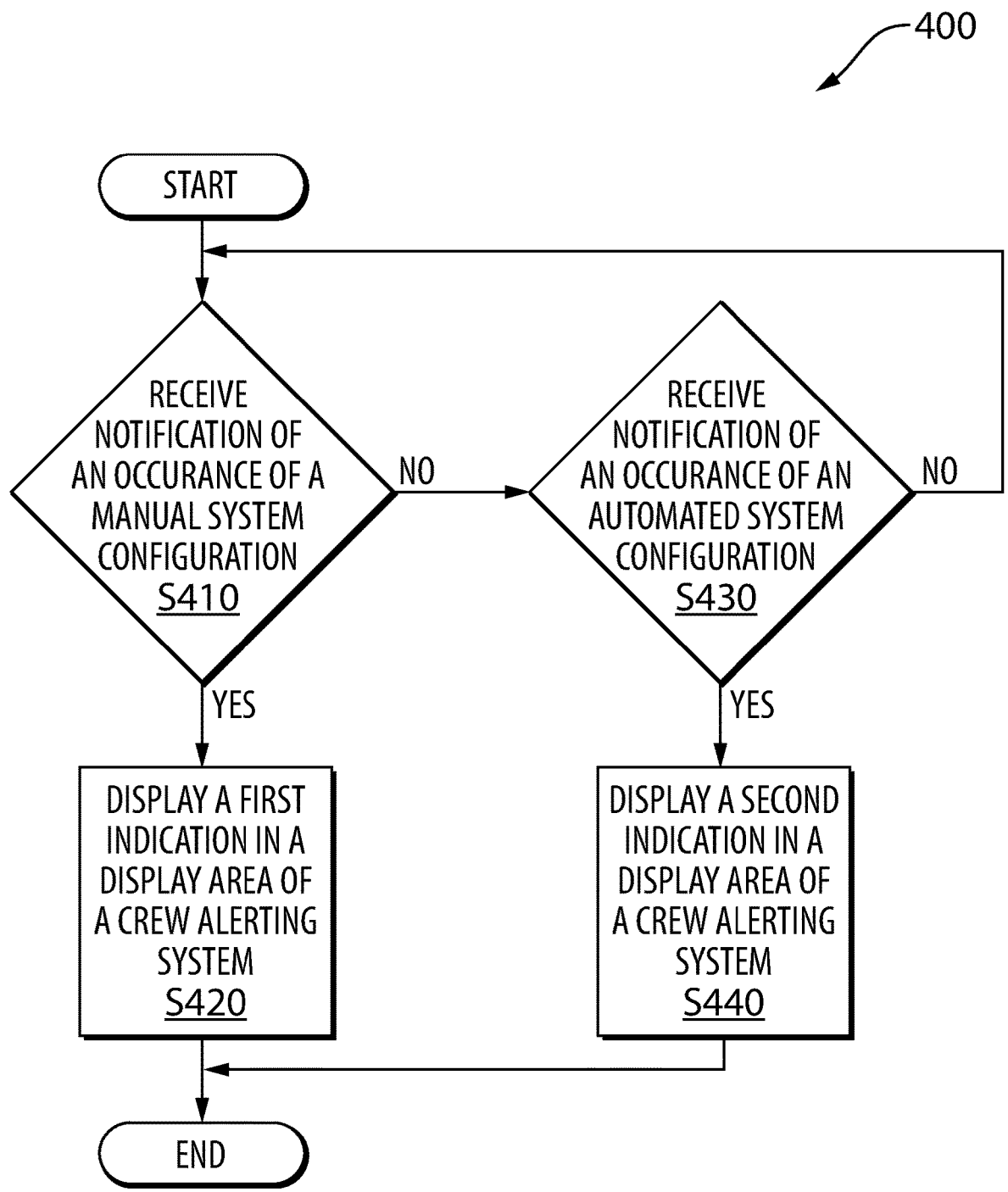
FIG. 4 is a flowchart illustrating a method for alerting a crew of a mobile platform such as the aircraft of FIG. 1 of an automated configuration associated with a system of the mobile platform.

FIG. 4 is a flowchart illustrating an example method 400 for alerting a flight crew of aircraft 10 of a relevant condition, such as a "status" and "advisory" of a configuration of a system 38, associated with aircraft 10. Method 400 may also be used for alerting a crew of a mobile platform of a relevant condition. Method 400 may be performed using CAS 24. For example, blocks S410 and onward of method 400 may be stored in the form of instructions 32 on computer 26 and executed by data processor 28 of computer 26.

At block S410, computer 26 evaluates whether a notification has been received of an occurrence of a manual system configuration of a system 38 of aircraft 10. If a notification of the manual system configuration is received, control flow proceeds to block S420. If no notification of the manual system configuration is received, control flow proceeds for block S430.

At block S420, upon receiving notification of the occurrence of the manual system configuration of a system 38 of aircraft 10, computer 26 displays a first indication 41 in CAS display area 16A. First indication 41 may include a textual message, as described herein.

At block S430, computer 26 evaluates whether a notification has been received of an occurrence of an automated system configuration of the system 38 of aircraft 10. The automated system configuration of the system 38 may perform equivalent actions on the system 38 as the manual system configuration of the system 38 as evaluated at block S410. If a notification of the occurrence of the automated system configuration is received, control flow proceeds to block S440. If no notification of the automated system configuration is received, control flow returns to block S410.

At block S440, upon receiving notification of the automated system configuration of the system 38 of aircraft 10, computer 26 displays a second indication 42 in CAS display area 16A. Second indication 42 may include a textual message 44A, for example a "status" message such as the first indication 41 as defined by block S420, in combination with a supplemental indication 44B which may be in the form of a graphical indication, and may function as an "advisory" message indicating that the configuration of the system 38 was performed automatically.

In some embodiments, supplemental indication 44B may comprise a graphical indication and/or a textual indication.

In some embodiments, textual message 44A and supplemental indication 44B may be displayed together as a single line item in CAS display area 16A. For example, textual message 44A and supplemental indication 44B may be displayed laterally adjacent one another in CAS display area 16A. In some embodiments, textual message 44A and supplemental indication 44B may be displayed in any suitable manner to achieve visual cohesion allowing textual message 44A and associated supplemental indication 44B to be interpreted together as second indication 42.

Method 400 may also comprise removing second indication 42 from CAS display area 16A upon conclusion of the relevant condition or configuration of the system 38.

Conveniently, having a supplemental indication 44B to provide, for example, an "advisory" message, to provide the same or a similar function or purpose as an "advisory" message, to supplement a textual message or "status" indication in a second indication 42 to indicate an automatic configuration or reconfiguration (for example, as opposed to a manual configuration or reconfiguration performed by the flight crew) may reduce the number of other advisories that are displayed, for example on a CAS display area 16A, to the flight crew. The supplemental indication 44B of a second indication 42 may thus be used in place of an additional or separate "advisory" indication or alert of a configuration being performed automatically that might take up more real estate on a display or be distracting to the flight crew. As such, it may be easier for the flight crew to pick out and identify other advisories or alerts that may be displayed, for example, in a case of loss of redundancy or fault in a system.

Second indication 42 may provide information to the flight crew about the relevant condition in a clear and integrated manner that is intuitive and relatively easy to interpret by the flight crew and may reduce clutter from advisory messages to the flight crew. The second indication 42 may provide information to the flight crew about the relevant condition without providing a full "advisory" message. This and the adjacent location of textual message 44A and supplemental indication 44B may contribute toward reducing the flight crew's workload during critical periods requiring the flight crew's attention.

Furthermore, more and more aircraft functions are becoming automated, and there is a trend towards use of a single pilot cockpit, which may incur an increase in "advisory"-type messages displayed to flight crew. Thus, various embodiments of a second indication 42 having a textual message 44A and a supplemental indication 44B disclosed herein, and an associated reduction in "advisory" messages, may avoid the flight crew from becoming desensitized to more important "advisory" messages.

The above description is meant to be exemplary only, and one skilled in the relevant arts will recognize that changes may be made to the embodiments described without departing from the scope of the disclosure. The present disclosure may be embodied in other specific forms without departing from the subject matter of the claims. Also, one skilled in the relevant arts will appreciate that while the systems, devices and methods disclosed and shown herein may comprise a specific number of elements/steps, the systems, devices and methods could be modified to include additional or fewer of such elements/steps. The present disclosure is also intended to cover and embrace all suitable changes in technology. Modifications which fall within the scope of the present disclosure will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A crew alerting system for a mobile platform, the system comprising:
   a display device defining a display area;
   one or more data processors operatively coupled to the display device; and
   a non-transitory machine-readable memory operatively coupled to the one or more data processors and storing instructions executable by the one or more processors and configured to cause the one or more processors to:
      upon receiving notification of an occurrence of a manual system configuration associated with the mobile platform, generate a first output for causing the display device to display a first indication in the display area, the first indication comprising a first textual message; and
      upon receiving notification of an occurrence of an automated system configuration associated with the mobile platform, generate a second output for causing the display device to display a second indication in the display area, the second indication comprising a second textual message accompanied by a supplemental indication;
   wherein a presence of the supplemental indication comprising a graphical indication in the second indication is associated with the automated system configuration of the mobile platform, and an absence of the supplemental indication comprising the graphical indication in the first or second indication is associated with the manual system configuration of the mobile platform, wherein the presence or absence of the graphical indication alone provides at-a-glance information on the automated or manual system configuration without including an alphanumeric message;
   wherein the first and second textual messages comprise a same content, the first and second indications associated with the manual system configuration and the automated system configuration respectively are associated with a same system of an aircraft, and the first and second textual messages are displayed upon receiving the notification of the occurrence of the manual system configuration and the occurrence of the automated system configuration respectively of the same system of the aircraft; and
   wherein the display area is a crew-alert-system (CAS) display area, said CAS display area displaying a plurality of textual messages informing of conditions of the mobile platform, said plurality of textual messages being organized in different colors corresponding to a level of alert or a relevancy of said conditions.

2. The crew alerting system of claim 1, wherein the first and second textual messages are of a same color.

3. The crew alerting system of claim 1, wherein the first and second textual messages are white.

4. The crew alerting system of claim 1, wherein the supplemental indication is disposed on a same line as the second textual message.

5. The crew alerting system of claim 1, wherein the supplemental indication is disposed in front of the second textual message.

6. The crew alerting system of claim 1, wherein the supplemental indication has a different color than the second textual message.

7. The crew alerting system of claim 1, wherein the supplemental indication is adjacent to the second textual message.

8. The crew alerting system of claim 1, wherein the supplemental indication is a graphical indication.

9. The crew alerting system of claim 8, wherein the graphical indication comprises a circle.

10. The crew alerting system of claim 1, wherein the manual system configuration and the automated system configuration perform equivalent actions on the system of the aircraft.

11. An aircraft comprising the crew alerting system of claim 1.

12. The crew alerting system of claim 1, wherein some of the plurality of textual messages are primarily displayed as line items.

13. A crew alerting system for a mobile platform, the system comprising:
   a display device defining a display area;
   one or more data processors operatively coupled to the display device; and
   a non-transitory machine-readable memory operatively coupled to the one or more data processors and storing instructions executable by the one or more processors and configured to cause the one or more processors to:
      upon receiving notification of an occurrence of an automated system configuration associated with the mobile platform, generate an output for causing the display device to display an indication in the display area, the indication comprising a textual message in a color associated with a status message accompanied by a graphical indication in a color associated with an advisory alert;
   wherein a presence of the graphical indication with the textual message is associated with the automated system configuration of the mobile platform, and an absence of the graphical indication with the textual message is associated with a manual system configuration of the mobile platform, wherein the presence or absence of the graphical indication alone provides at-a-glance information on the automated or manual system configuration without including an alphanumeric message; and
   wherein the display area is a crew-alert-system (CAS) display area, said CAS display area displaying a plurality of textual messages informing of conditions of the mobile platform, said plurality of textual messages being organized in different colors corresponding to a level of alert or a relevancy of said conditions; and
   wherein the plurality of textual messages are displayed upon receiving a notification of an occurrence of the manual system configuration and the occurrence of the automated system configuration respectively of the same system of an aircraft.

14. The crew alerting system of claim 13, wherein some of the plurality of textual messages are primarily displayed as line items.

15. A method for alerting a crew of a mobile platform of a system configuration associated with the mobile platform using a display area of a crew alerting system of the mobile platform, the method comprising:
   upon receiving notification of an occurrence of a manual system configuration associated with the mobile platform, displaying a first indication in the display area of the crew alerting system of the mobile platform, the first indication comprising a first textual message; and
   upon receiving notification of an occurrence of an automated system configuration associated with the mobile platform, displaying a second indication in the display area of the crew alerting system of the mobile platform, the second indication comprising a second textual message accompanied by a supplemental indication;

wherein a presence of the supplemental indication comprising a graphical indication in the second indication is associated with the automated system configuration of the mobile platform, and an absence of the supplemental indication comprising the graphical indication in the first or second indication is associated with the manual system configuration of the mobile platform, wherein the presence or absence of the graphical indication alone provides at-a-glance information on the automated or manual system configuration without including an alphanumeric message;

wherein the first and second textual messages comprise a same content, the first and second indications associated with the manual system configuration and the automated system configuration respectively are associated with a same system of an aircraft, and the first and second textual messages are displayed upon receiving the notification of the occurrence of the manual system configuration and the occurrence of the automated system configuration respectively of the same system of the aircraft; and wherein the display area is a crew-alert-system (CAS) display area, said CAS display area displaying a plurality of textual messages informing of conditions of the mobile platform, said plurality of textual messages being organized in different colors corresponding to a level of alert or a relevancy of said conditions.

16. The method of claim 15, wherein the first and second textual messages are of a same color.

17. The method of claim 15, wherein the first and second textual messages are white.

18. The method of claim 15, wherein the supplemental indication is disposed on the same line as the second textual message.

19. The method of claim 15, wherein the supplemental indication is disposed in front of the second textual message.

20. The method of claim 15, wherein some of the plurality of textual messages are primarily displayed as line items.

* * * * *